Figure 1:
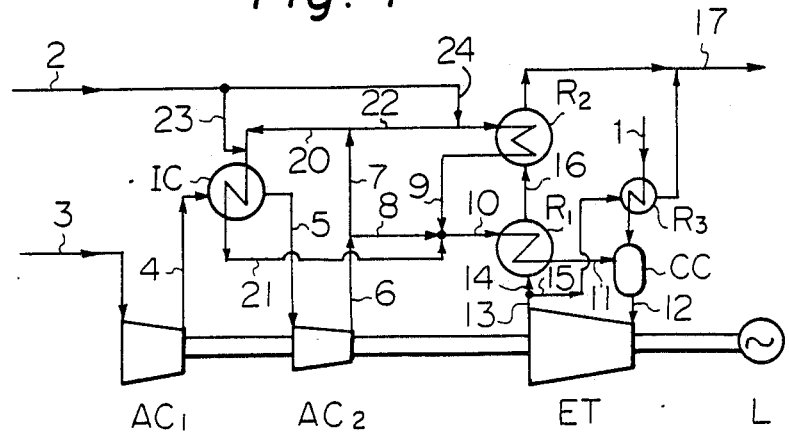

United States Patent [19]

Nakamura et al.

[11] Patent Number: 4,653,268

[45] Date of Patent: Mar. 31, 1987

[54] REGENERATIVE GAS TURBINE CYCLE

[75] Inventors: Hiromi Nakamura; Takehiko Takahashi, both of Chiba; Norio Narazaki; Kazuo Yamamoto, both of Kanagawa; Norio Sayama, Chiba, all of Japan

[73] Assignee: Mitsubishi Gas Chemical Co., Inc., Tokyo, Japan

[21] Appl. No.: 741,729

[22] Filed: Jun. 6, 1985

Related U.S. Application Data

[63] Continuation of Ser. No. 448,321, Dec. 9, 1982, abandoned.

[30] Foreign Application Priority Data

Dec. 10, 1981 [JP] Japan .................................. 56-199361
Dec. 10, 1981 [JP] Japan .................................. 56-199363

[51] Int. Cl.[4] .............................................. F02C 3/30
[52] U.S. Cl. ..................................... 60/39.05; 60/39.53
[58] Field of Search .................. 60/39.05, 39.53, 39.55, 60/39.58, 39.59, 728, 736

[56] References Cited

U.S. PATENT DOCUMENTS

| | | | |
|---|---|---|---|
| 2,115,338 | 4/1938 | Lysholm | 60/39.05 |
| 2,186,706 | 1/1940 | Martinka | 60/728 |
| 2,602,289 | 7/1952 | Anxionnaz et al. | 60/736 |
| 3,379,009 | 4/1968 | Sharp et al. | 60/736 |
| 3,877,218 | 4/1975 | Nebgen | 60/728 |
| 4,418,527 | 12/1983 | Schlom et al. | 60/728 |

FOREIGN PATENT DOCUMENTS 286978 11/1952 Switzerland ...................... 60/39.53

OTHER PUBLICATIONS

Zuorow, M. J. *Aircraft and Missle Propulsion* New York, Wiley & Sons, 1958, pp. 24, 26,63.

*Primary Examiner*—Louis J. Casaregola
*Attorney, Agent, or Firm*—Cushman, Darby & Cushman

[57] ABSTRACT

In a regenerative gas turbine cycle in which heat recovery is carried out by multi-phase and multi-component mixture of compressed air/liquid phase water/steam (hereinafter referred to as MPC mixture), said mixture being obtained by injection of liquid phase water (hereinafter referred to simply as water) into a part of or the whole of compressed gas using air or air based gas (hereinafter referred to as air) as a combustion supporting/working medium gas; the improvement comprising
(a) intercooling of said compressor, and/or
(b) precooling of the compressed air for producing the MPC mixture
by a part of the MPC mixture.

4 Claims, 2 Drawing Figures

REGENERATIVE GAS TURBINE CYCLE

This is a continuation of application Ser. No. 448,321 filed Dec. 9, 1982 which was abandoned upon the filing hereof.

FIELD OF THE INVENTION

The present invention relates to a regenerative cycle of a water injection type gas turbine cycle utilizing a novel method of heat recovery for regeneration. The present invention not only utilizes heat recovery of the gas turbine exhaust gas at a low temperature range but also (a) intercooling of the compressor, and/or (b) precooling of compressed air for producing a multi-phase and multi-component mixture of compressed air/liquid phase water/steam (hereinafter referred to as MPC mixture) and is obtained by injection of liquid phase water (hereinafter referred to as water) into a part of or the entire compressed gas which is compressed by a compressor for compressing gas using air or air-based gas (hereinafter referred to simply as air).

As will later be explained, the gas turbine cycle operating on the principle of this invention can provide thermal efficiency of more than 50% (LHV) at a turbine inlet temperature of 1,000° C., under practical conditions. This means an increase in thermal efficiency to approximately 2 times as compared to the thermal efficiency for conventional simple gas turbine cycles, with a corresponding reduction of 50% in fuel consumption.

BACKGROUND OF THE INVENTION

Conventionally, heat of the turbine exhaust gas in a gas turbine cycle has been recovered by means of preheating air or withdrawal of refrigerative energy by means of absorbent type refrigerant or generation of steam by a waste heat boiler. In addition, in some prior art gas turbine cycles, air preheating is carried out through a mixture of air/steam which is obtained by injection of water into compressed air.

The following publications teach the regenerative cycle of water injection type gas turbines; The U.S. Pat. No. 2,095,991, No. 2,115,112, No. 2,115,338, No. 2,678,532 and No. 2,869,324, Swiss Pat. No. 457,039, and French Pat. No. 1,007,140.

Other publications, reporting on these patents include "Gas Turbines with Heat Exchanger and Water Injection in the Compressed Air", Combustion vol. 44, No. 6, December 1972, p. 32–40, by N. Gasparovic et al. (hereinafter referred to as report A) and Combustion vol. 45, No. 6, December 1973, p. 6–16 (hereinafter referred to as report B).

Each of the above-mentioned patents discloses the method of heat recovery by the use of a mixture of compressed air/steam with a description of the process of injecting water to be mixed with the compressed air or with the intermediately compressed air. Reports A and B state in reference to these patents that the increase in thermal efficiency attainable with each of them has been proved to be about 1.5 times that for conventional simple gas turbine cycles in spite of great increases in the specific power. These achievements are not completely satisfactory; rather, they are poor from the viewpoint of the utility and practicability of general power generation as reflected in the concept of a combined cycle of gas turbine and steam turbine. With the recent dramatic increase of fuel prices (by 20 times in 10 years), the direction of the development of a more effective power generating plant capable of a significant increase in thermal efficiency has taken a general turn toward the possibility of embodying a combined cycle gas turbine and steam turbine.

The applicants of the present invention have found that an increase of thermal efficiency is achieved by the system in which heat recovery of turbine exhaust gas is carried out by an MPC mixture of compressed air/water/steam which is obtained by injection of water into a part of or the whole of compressed air, and filed several applications such as Japanese patent application No. 55-78808 on the basis of the above discovery.

SUMMARY OF THE INVENTION

Further studies on the basis of the past patent applications has resulted in the addition of a further improvement, as disclosed in the present invention, in which further improvement of thermal efficiency is obtained by the system in which not only heat recovery of turbine exhaust gas is utilized but also (a) intercooling of the compressor, and/or (b) precooling of the compressed air for producing the MPC mixture, are carried out by a part of the total MPC mixture.

The values of the thermal efficiency obtainable with a gas turbine cycle according to the present invention would be higher than those possible with a combined cycle gas turbine and steam turbine as mentioned above.

The MPC mixture may take, for the purpose of this invention, a practical form that permits partial recirculation through and substantially successive dispersion in a heat exchange, but not necessarily an ideal form such as the atomized or misty state assumed for heat transfer.

Although the principle of the present invention should by now be apparent from the above description, the operation of preferred embodiment of the invention will be briefly summarized by use of flowsheets in the interest of further understanding.

DETAILED EXPLANATION OF THE INVENTION

Figure 2:
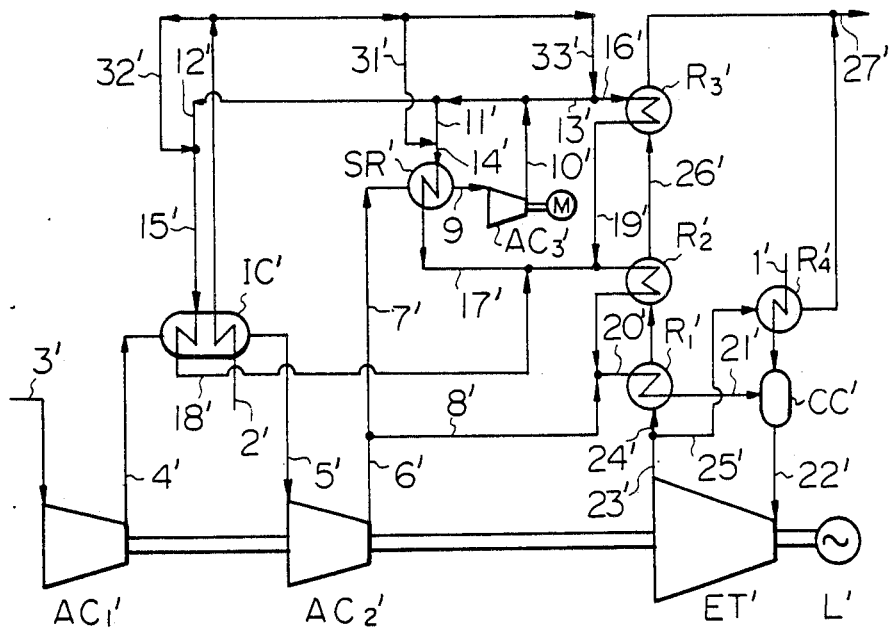

The attached FIGS. 1 and 2 are flowsheets each representing the operation of one preferred embodiment of the invention.

FIG. 1 represents in the form of a flowsheet a preferred embodiment of the present invention embodying intercooling of the compressor described above, a gas turbine cycle comprises 3 regenerators, an intercooler, two air compressors, and a turbine.

FIG. 2 represents in the form of a flowsheet embodiment of the present invention embodying said intercooling of the compressor and precooling of the compressed air to produce the MPC mixture described above which comprises four regenerators, an intercooler, a heat exchanger (intended for a cooling compressed air before it is mixed to form a MPC mixture and hereinafter called a self-heat exchanger), two air compressors, a supplemental air compressor, and a turbine.

In FIG. 1, a first air compressor ($AC_1$) is mounted to draw ambient air (3) which is there subjected to adiabatic compression for transfer to the intercooler (IC) by way of a conduit (4). This air, or what is now called intermediate compressed air (5) after being cooled by the intercooler (IC), is then introduced to a second air compressor ($AC_2$) which compresses the air again adiabatically for discharge into a conduit (6). A portion of the compressed air passed into that conduit (6) is routed through a conduit (7) into both a low temperature regenerator ($R_2$) and the intercooler (IC), respectively by way of branched passageways (22) and (20). On the other hand, the remaining compressed air is introduced into a high temperature regenerator ($R_1$) through a conduit (8). A pressurized water pipe (2) is intercommunicated with both the passageways (22) and (20), respectively by way of water pipes (24) and (23), to supply water. In this manner, the passageways each mix the compressed air, water and steam present therein into an MPC mixture, combined in desired proportions as required. The mixture is used for heat recovery and intercooling of the compressor. In the low temperature regenerator ($R_2$) and the intercooler (IC), heat recovery is accomplished mainly on the basis of latent heat that is absorbed by change of phase from water in the MPC mixture into steam. Consequently, a normally fully, or slightly less, saturated mixture of compressed air/steam is produced by the intercooler and the low temperature regenerator for discharge into their respective outlet conduits (21) and (9) that converge to intercommunicate with the conduit (8) that, as has previously been stated, branches out to conduct part of the compressed air from the second air compressor. The saturated mixture of compressed air/steam from the intercooler and low temperature regenerator and the compressed air from the second air compressor are consequently combined and passed through a conduit (10) to the high temperature regenerator ($R_1$) to be further preheated there and introduced to a combustion chamber (CC) by way of a conduit (11). A regenerator ($R_3$) is connected to the combustion chamber (CC) and preheats the fuel (1) to be discharged into the combustion chamber which burns the preheated fuel thereby producing combustion gases with a required temperature for introduction into a expansion turbine (ET) through an inlet conduit (12). In the turbine the combustion gas undergoes adiabatic expansion to generate the rotary energy to drive a load (L) through the turbine as well as the first and second air compressors ($AC_1$) and ($AC_2$) and is expelled from the outlet side of the turbine through an outlet conduit (13). A passageway (15) is connected to the outlet conduit to carry part of the exhaust gas which is used for preheating the fuel. The remaining part of the exhaust gas is, on the other hand, routed through a passageway (14) to the high temperature regenerator ($R_1$) and, leaving it through a passageway (16), to the low temperature regenerator ($R_2$). Both flows of exhaust gas are used for the purpose of heat recovery. The turbine exhaust gas, after leaving the temperature regenerators ($R_2$) and ($R_3$), is discharged as low temperature waste gas (17) to atmosphere. Apart from the above-mentioned functions, the practical design of the regenerative gas turbine cycle requires the inclusion of other mechanisms for its proper operation, such as the means of providing sealing air for the turbine (ET), the first and the second air compressors ($AC_1$) and ($AC_2$), and cooling air for the turbine (ET).

Since, compressed air at low temperature is obtained through the process of operation according to the present invention, the amount of compressed air for cooling the turbine is reduced in comparison with conventional regenerative gas turbines. This feature also promises much in the contribution to increasing the thermal efficiency for gas turbine cycle.

In FIG. 2, a first air compressor ($AC'_1$) is mounted to draw ambient air (3') which is there subjected to adiabatic compression for transfer to the intercooler (IC') by way of a conduit (4'). This air, or what is now called intermediate compressed air (5') after being cooled by the intercooler (IC'), is then addressed to a second air compressor ($AC'_2$) which compresses the air again adiabatically for discharge into a conduit (6'). A portion of the compressed air passed into the conduit (6') is routed through a conduit (7') into a self-heat exchanger (SR') for cooling and, after leaving the self-heat exchanger, is routed by way of a conduit (9') into a supplemental air compressor ($AC'_3$) in which the compressed air is further compressed to the extent to which it was decreased in pressure as in the heat exchangers etc. A conduit (10') is mounted downstream of the supplemental air compressor and branches off at its downstream into three conduits (11'), (12') and (13'). A pressurized water pipe (2') is also mounted to provide pressurized water to the intercooler (IC') for use as the medium to achieve low temperature heat recovery. This pressurized water pipe diverges ito three water pipes (31'), (32') and (33') that are intercommunicated with the conduits (11'), (12') and (13') to supply pressurized water therewith to mix the compressed air present in the conduits to form a MPC mixture. The mixture thus produced is then introduced into the self-heat exchanger (SR'), the intercooler (IC'), and a low temperature regenerator ($R'_3$), respectively by way of conduits (14'), (15') and (16'). The remaining compressed air leaving the conduit (6') is routed into a high temperature regenerator ($R'_1$) through a conduit (8'). In the self-heat exchanger (SR'), the intercooler (IC'), and the low temperature regenerator ($R'_3$), heat recovery is carried out mainly on the basis of latent heat that is absorbed by change of phase from water in the MPC mixture into steam. In consequence, a normally fully, or slightly less, saturated mixture of compressed air/steam is generated to discharge into an intermediate temperature regenerator ($R'_2$) by way of conduits (17'), (18') and (19') and undergoes heat recovery there until it is equalized in temperature with that of the compressed air passed through the conduit (8'). Thereafter, the mixture is combined with the compressed air from the conduit (8') to be discharged through a conduit (20') into the high temperature regenerator ($R'_1$) and, after undergoing heat recovery, is introduced into a combustion chamber (CC') by way of a conduit (21'). A regenerator ($R'_4$) is connected to the combustion chamber (CC') and preheats the fuel to discharge through a passageway (1') into the combustion chamber which in turn burns the fuel to generate combustion gas with a required temperature to discharge into a turbine (ET') through a passageway (22'). In the turbine the combustion gas undergoes adiabatic expansion to generate the rotary energy to drive a load (L'), the first and the second air compressors ($AC'_1$) and ($AC'_2$), and is expelled from the outlet of the turbine through a passageway (23'). A part of the exhaust gas is conducted through a conduit (25') into the preheater ($R'_4$). The remainder of the exhaust gas, on the other hand, is conducted through a conduit (24') into the high temperature regenerator ($R'_1$), then to the intermediate temperature regenerator ($R'_2$), and finally to the low temperature regenerator ($R'_3$) by way of a conduit (26') until it is discharged as low temperature waste gas (27') after leaving the low temperature regenerator. It is to be noted that, apart from the above explained functions, the practical design of the regenerative gas turbine cycle requires the inclusion of other mechanisms for its proper operation, such as the means of providing sealing air for the turbine (ET'), the first and the second air compressors (AC'$_1$) and (AC'$_2$), and the means of cooling the turbine (ET') by the conduction of cooled air. Since, compressed air at low temperature is obtained through the process of operation according to the present embodiment, the amount of compressed cooling air for cooling the turbine is reduced in comparison with conventional regenerative gas turbine cycle. This feature also promises to contribute much to increasing the thermal efficiency for gas turbine cycle.

The present invention, as has been illustrated in conjunction with flowsheets, provides a regenerative gas turbine cycle which is characterized by the usage of MPC mixture not only as a cooling medium for heat recovery of the exhaust gas but also as (a) a cooling medium for a compressed air at intermediate stage, and/or (b) a cooling medium for compressed air (and water, if its temperature is high) for producing the MPC mixture.

In the case of (a) described above, apart from the conventional intercooling, intercooling is accomplished without discharging heat of adiabatically compressed air at intermediate stage out of the system. Further, in the case of (b) described above, the MPC mixture significantly, low temperature is obtained in comparison with the conventional simple mixture of the compressed air and pressurized water without discharging heat out of the system.

Thus, the present invention comprises each of or both of (a) and (b) described above and various modifications are possible without departing from the principle of the invention. For example, the position where the pressurized water is used as low temperature heat recovering medium may be changed or no water need be used as low temperature heat recovering medium; as an additional cooling medium fuel may be used at the stage of intercooling; and, mixture of fuel/water/steam may be used for intercooling or heat recovery where the gas turbine cycle operates on a gaseous or a volatile fuel. The present invention also permits many other variations, such as change to an operation on the principle of reheating cycle, the addition of a condenser to recover the water from waste gas by condensation. In addition, the gas turbine cycle of this invention provides a desirable relationship of compression ratio with thermal efficiency, so that the thermal efficiency exhibits a lower rate of reduction with increasing compression ratio compared with conventional gas turbines. This feature is particularly advantageous with high specific power or in the case of operation on a reheat cycle.

The basic concept of the regenerative gas turbine cycle in according to the present invention is believed to be apparent from the above explanation including a description of its preferred embodiment. In order to make best use of the phenomenon of change of phase from water in the MPC mixture into steam, the amount of compressed air producing MPC mixture which is used for low temperature heat recovery of the turbine exhaust gas, intercooling of the compressor or self heat exchanging is determined by taking into consideration the practical condition such as temperature differences of heat exchangers. In this sense, in effect, the amount of compressed air must be limited to the minimum required from the view point of the thermal efficiency. The amount of water for injection to mix with the compressed air must be appropriately determined depending on conditions of operation.

The optimum range of operating conditions in this sense should vary depending on different variations based on the principle of the present invention: for example, change in the location of use of pressurized water as the low temperature heat recovering medium, no use of pressurized water as heat recovering medium at all; the use of fuel as the additional cooling medium for intercooling; the use of a mixture of fuel/water/steam for intercooling as well as for heat recovery in case the gas turbine cycle operates on a gaseous or a volatile fuel; operation on the principle of a reheating cycle; the addition of a condenser for recovery of the water contained in waste gas by condensation; and turbine inlet operating conditions.

In general, the amount of the compressed air for producing the multi-phase mixture is more than 20% for the total compressed air, and preferably more than 40%. From the viewpoint of thermal efficiency the optimum amount of the compressed air should be selected. The amount of the part of MPC mixture for use as operations (a) and (b) described above is between 30–80% of the total MPC mixture, and more preferably between 40–70%. Further, the amount of the injected water is between 0.1–0.4 kg-mole for 1 kg-mole of intaked air and the optimum amount of the water alters by the operating conditions and efficiencies of machineries.

To illustrate in detail, still referring to the flowsheet of the attached FIG. 1, with turbine inlet operating conditions of 6 ata. and 1,000° C., the range for advantageously using the change of phase from water contained in the MPC mixtures into steam lies in the range of between 0.2–0.5 kg-mole or more preferably, between 0.25–0.35 kg-mole for 1 kg-mole of intaked air against the amount of compressed air which produces the MPC mixture for intercooling in the compressor or low temperature heat recovery of the turbine exhaust gas and in the range of between 0.1–0.2 kg-mole, or more preferably, between 0.11–0.15 kg-mole for 1 kg-mole of the intaked air against the amount of water which is to be injected into the compressed air.

Further, referring to the flowsheet of the attached FIG. 2, with turbine inlet operating conditions of, say, 6 ata. and 1,000° C., the amount of compressed air for producing the MPC mixture may be above 0.3 kg-mole for 1 kg-mole of the intaked air in the compressor. However, from the standpoint of thermal efficiency, it must preferably be maintained at the minimum possible within the optimum range. The optimum amount of the pressurized water to be mixed with compressed air must lie in the range of between 0.1 to 0.2 kg-mole, or more preferably, between 0.12 to 0.16 kg-mole for 1 kg-mole of the intaked air. In addition, the pressure distribution in the compressors before and after intercooling must be decided in the light of the intercooling effect to help reduce the compressor driving power.

To provide a more clear idea of the present invention, the detailed requirements for the operation of one preferred embodiment is given in Table 1. The conditions involved in some of the operating factors in Table 1 are as shown in Tables 2 and 3.

TABLE 1

Ratings for one preferred embodiment of the present invention

|  |  | FIG. 1 | FIG. 2 |
|---|---|---|---|
| Conditions | Ambient temperature | 15° C. | 15° C. |
|  | atmospheric pressure | 1.033 ata. | 1.033 ata. |
|  | relative humidity | 60% | 60% |
|  | fuel | natural gas | natural gas |
|  | - temperature | 15° C. | 15° C. |
|  | - heating value | 245233 kcal/kg-mole (HHV) | 245233 kcal/kg-mole (HHV) |
|  |  | 221552 kcal/kg-mole (LHV) | 221552 kcal/kg-mole (LHV) |
| Ratings | water temperature | 15° C. | 15° C. |
|  | turbine inlet pressure | 6 ata. | 7 ata. |
|  | compressor ($AC_2$) outlet temperature | 151° C. | 144° C. |
|  | ratio of air for producing MPC mixture and intaked in the cycle | 28% | 53% |
|  | turbine inlet temperature | 1,000° C. | 1,000° C. |
|  | waste gas temperature | 80° C. | 80° C. |
|  | air flow | 1.01 kg-mole/sec. | 1.01 kg-mole/sec. |
|  | waste gas flow | 1.15 kg-mole/sec. | 1.16 kg-mole/sec. |
|  | water flow | 0.132 kg-mole/sec. | 0.141 kg-mole/sec. |
|  | sending end output (Notes 1 and 2) | 8730 KW | 9430 KW |
|  | sending end thermal efficiency (LHV) | 50.4% | 51.2% |

Notes
1. The proportion of the energy absorbed to drive the gas turbine auxiliary machines and other related attachments is assumed to be 0.3 percent with respect to the total turbine output.
2. The amount of the cooling air used for cooling the turbine is determined in the light of the availability of low temperature compressed air produced in the operation of the present gas turbine.

TABLE 2

The conditions of some operating factors of FIG. 1 listed in Table 1

| various efficiencies | compressor adiabatic efficiency | 89% |
|---|---|---|
|  | turbine adiabatic efficiency | 91% |
|  | combustion efficiency | 99.9% |
|  | mechanical efficiency | 99% |
|  | generator efficiency | 98.5% |
|  | total pressure loss | 12.8% |
| minimum temperature difference of heat exchanger | IC | 10° C. |
|  | $R_1$ | 30° C. |
|  | $R_2$ | 10° C. |
|  | $R_3$ | 30° C. |

TABLE 3

The conditions of some operating factors of FIG. 2 listed in Table 1

| various efficiencies | compressor adiabatic efficiency |  | 89% |
|---|---|---|---|
|  | turbine adiabatic efficiency |  | 91% |
|  | combustion efficiency |  | 99.9% |
|  | mechanical efficiency |  | 99% |
|  | generator efficiency |  | 98.5% |
|  | total pressure loss |  | 16.1% |
| minimum temperature difference in heat exchanger | IC | (MPC mixture) | 10° C. |
|  |  | (water) | 20° C. |
|  | SR |  | 10° C. |
|  | $R_1$ |  | 30° C. |
|  | $R_2$ |  | 30° C. |
|  | $R_3$ |  | 10° C. |
|  | $R_4$ |  | 30° C. |

What is claimed is:

1. A method for operating a regenerative gas turbine cycle with water injection, wherein heat recovery is carried out by a mixture which is obtained form water injection into a compressed gaseous medium, said method comprising the steps of;
   (a) compressing a gaseous medium to a predetermined pressure,
   (b) dividing the compressed gaseous medium into two parts, one part of it being used for the gaseous medium into which water is injected,
   (c) injecting water into a portion of said one part of the compressed gaseous medium so that a multi-phase and multi-component mixture (MPCM) of compressed gaseous medium/water/steam is obtained,
   (d) recovering heat from exhaust gas of a gas turbine by the MPCM so that the MPCM changes into single-phase and multi-component mixture (SPCM) of compressed gaseous medium/steam,
   (e) injecting water into another portion of said one part of the compressed gaseous medium so that a multi-phase and multi-component mixture (MPCM) of compressed gaseous medium/water/steam is obtained,
   (f) cooling said one part of the compressed gaseous medium before any injection of water thereinto by the MPCM obtained from step (e) to recover heat therefrom so that the MPCM changes into SPCM, the thus obtained SPCM being mixed with the SPCM obtained in step (d),
   (g) recovering heat from the exhaust gas by said mixture of SPCM obtained in step (f) and the other part of the compressed gaseous medium obtained in step (b) to form a heated compressed gaseous medium,
   (h) burning fuel together with said heated compressed gaseous medium to drive the gas turbine for creation of power and discharging the exhaust gas from the turbine, and
   (i) supplying water of an amount corresponding to what is consumed through the injection of water.

2. A method according to claim 1 wherein the amount of the water introduced in the cycle is between 0.1–0.4 kg-mol for 1 kg-mol of the total intaked gaseous medium.

3. A method according to claim 1 further including the step of;
   compressing said one part of the compressed gaseous medium after it is cooled in step (f) by a supplemental compressor for recovery of pressure drop through heat exchange in step (f).

4. A method according to claim 1 wherein the compression of the gaseous medium in step (a) is achieved by two compressors and the medium is inter-cooled between the two copmressors by an MPCM obtained from another portion of said one part of the compressed gaseous medium and water injected thereinto so that the MPCM changes into a SPCM, the thus obtained SPCM being mixed with the SPCM obtained in step (d).

* * * * *